(12) United States Patent
Reviel (10) Patent No.: US 9,638,365 B1
(45) Date of Patent: May 2, 2017

(54) MULTIPURPOSE CONNECTOR SYSTEM

(71) Applicant: Marc Reviel, Cedar Park, TX (US)

(72) Inventor: Marc Reviel, Cedar Park, TX (US)

( * ) Notice: Subject to any disclaimer, the term of this patent is extended or adjusted under 35 U.S.C. 154(b) by 899 days.

(21) Appl. No.: 13/935,907

(22) Filed: Jul. 5, 2013

(51) Int. Cl.
*F16L 21/06* (2006.01)
*F16B 7/04* (2006.01)
*F16L 47/28* (2006.01)
*F16L 41/08* (2006.01)

(52) U.S. Cl.
CPC ............. *F16L 21/06* (2013.01); *F16B 7/048* (2013.01); *F16L 41/08* (2013.01); *F16L 47/28* (2013.01)

(58) Field of Classification Search
CPC ....... F16L 21/06; F16L 41/001; F16L 41/004; F16L 41/02; F16L 41/021; F16L 41/08; F16L 47/26; F16L 47/28; F16L 47/30; F16L 47/32; F16B 7/04; F16B 7/044; F16B 7/048; F16B 12/40; F16B 12/42; F16B 2012/446; A47B 13/003; A47B 2097/005; E04G 7/02; E04G 7/12; E04G 7/14; E04G 7/28; E04G 2007/285; E04B 1/2403; E04B 2001/2406; F16M 11/02; F16M 11/20
USPC ..... 135/909; 285/125.1, 126.1, 129.1, 130.1, 285/133.11, 179, 179.1, 406, 420; 403/169, 170, 300, 403
See application file for complete search history.

(56) References Cited

U.S. PATENT DOCUMENTS

| | | | | |
|---|---|---|---|---|
| 20,717 A | | 6/1858 | Kahnweiler | |
| 927,219 A | * | 7/1909 | Burns ...................... | H02G 3/06 16/2.1 |
| 960,744 A | * | 6/1910 | Vogel ....................... | H02G 3/06 138/89 |
| 1,112,953 A | * | 10/1914 | Webb ....................... | H02G 3/06 200/DIG. 24 |
| 1,150,781 A | * | 8/1915 | Louden .................. | E04B 1/1903 135/909 |
| 1,362,718 A | * | 12/1920 | McNamara ............. | E03C 1/122 285/125.1 |
| 1,370,224 A | * | 3/1921 | Redding ................ | F16K 27/105 228/164 |
| 1,423,309 A | * | 7/1922 | Curtis .................... | H02G 3/185 138/106 |
| 1,650,233 A | * | 11/1927 | Plunkett ............... | H02G 3/0616 174/541 |
| 1,767,226 A | * | 6/1930 | Pearson ................ | E05B 65/006 220/3.8 |
| 1,816,670 A | * | 7/1931 | Church .................... | H02G 3/06 285/179.1 |

(Continued)

FOREIGN PATENT DOCUMENTS

DE  20 2005 013 777 U1 * 12/2005
EP  1293686 B1  9/2002

*Primary Examiner* — Robert Canfield
(74) *Attorney, Agent, or Firm* — Scheinberg & Associates, P.C.

(57) ABSTRACT

A multipurpose connector system for securing various planar and rigid structures to cylindrical bodies, such as tubes and pipes wherein the connector system comprises a versatile arrangement of connection capabilities that allows for the tight interconnections, adaptability, and internal system to carry and protect wires. The system includes the ability to connect a planar or rigid body, such as a VESA display screen, to a rod or tube system using a combination of eight independent connectors that allow for a large variety of connection arrangements.

9 Claims, 8 Drawing Sheets

(56) References Cited

U.S. PATENT DOCUMENTS

| | | | | |
|---|---|---|---|---|
| 1,859,972 A * | 5/1932 | Key | F16L 41/02 | 285/114 |
| 1,864,339 A * | 6/1932 | Church | F16L 21/06 | 285/383 |
| 1,950,965 A * | 3/1934 | Blackburn | E01F 15/0423 | 182/113 |
| 2,775,469 A * | 12/1956 | Brown | F16L 41/021 | 285/133.21 |
| 2,911,235 A * | 11/1959 | Stumbough | E03C 1/122 | 285/16 |
| 2,955,851 A * | 10/1960 | Scott | H02G 3/06 | 285/179.1 |
| 3,004,781 A * | 10/1961 | Morris | F16L 21/06 | 285/369 |
| 3,424,178 A * | 1/1969 | Yazaki | A01G 9/16 | 135/119 |
| 3,430,799 A * | 3/1969 | Maier | H02G 15/10 | 220/3.94 |
| 3,462,021 A * | 8/1969 | Hawke | A47F 5/14 | 108/101 |
| 3,533,650 A * | 10/1970 | Smith | F16L 41/06 | 285/197 |
| 3,761,114 A | 9/1973 | Blakeley | | |
| D263,415 S | 3/1982 | Roche | | |
| 4,473,246 A * | 9/1984 | McDowell | F16L 21/065 | 285/330 |
| 4,508,371 A * | 4/1985 | Maier | F16L 45/00 | 220/788 |
| 4,595,319 A * | 6/1986 | Cook | F16L 57/06 | 285/179 |
| 4,619,545 A * | 10/1986 | Kuttenbaum | F16B 2/065 | 403/169 |
| 4,753,462 A * | 6/1988 | Liu | F16B 7/1418 | 285/420 |
| 4,848,396 A * | 7/1989 | Sisk | B65G 53/52 | 137/375 |
| 4,850,736 A * | 7/1989 | Petrie | E21B 19/10 | 166/72 |
| 5,040,828 A * | 8/1991 | Kane | F16L 41/12 | 285/197 |
| 5,066,053 A * | 11/1991 | Miller | F16L 55/17 | 277/616 |
| 5,533,763 A * | 7/1996 | Neuhof | F16M 11/04 | 285/179 |
| 5,676,404 A * | 10/1997 | Sisk | F16L 41/021 | 285/133.11 |
| 5,687,994 A | 11/1997 | Hansen | | |
| 5,927,363 A * | 7/1999 | Olsen | E04F 10/02 | 135/116 |
| 6,050,615 A | 4/2000 | Weinhold | | |
| D423,918 S * | 5/2000 | Hirano | D8/382 | |
| 6,131,957 A * | 10/2000 | Saito | F16L 21/04 | 285/133.21 |
| 6,612,341 B2 * | 9/2003 | Vu | F16L 55/175 | 138/158 |
| 6,848,679 B2 * | 2/2005 | Higgs | E04F 11/1812 | 256/65.14 |
| 6,884,373 B1 * | 4/2005 | Johnson | F16L 55/175 | 138/99 |
| 6,990,718 B2 * | 1/2006 | Gregory | F16L 41/06 | 138/158 |
| 7,252,310 B2 * | 8/2007 | Amedure | F16L 21/005 | 285/330 |
| D576,870 S * | 9/2008 | Eason | D17/22 | |
| 7,475,919 B2 * | 1/2009 | Hiernard | F01N 13/1805 | 285/373 |
| 7,893,363 B2 * | 2/2011 | Pyron | H02G 3/06 | 174/24 |
| 8,096,325 B2 * | 1/2012 | Pyron | F16L 45/00 | 138/89 |
| 8,439,408 B2 * | 5/2013 | Glocer | F16L 41/06 | 24/279 |
| 8,727,083 B2 * | 5/2014 | Lai | A45C 5/02 | 135/909 |
| 9,255,396 B2 * | 2/2016 | Eberhart | F16B 7/044 | |
| 9,328,855 B2 * | 5/2016 | Sisk | F16L 37/18 | |
| 9,341,292 B2 * | 5/2016 | Smith | F16L 25/00 | |
| 2002/0167168 A1 * | 11/2002 | Pyron | H02G 3/18 | 285/284.1 |
| 2003/0094604 A1 * | 5/2003 | Higgs | E04F 11/1812 | 256/65.01 |
| 2004/0101354 A1 * | 5/2004 | Nakahori | F16B 7/0426 | 403/169 |
| 2008/0105804 A1 | 5/2008 | Horner et al. | | |
| 2008/0236862 A1 * | 10/2008 | Elder | H02G 3/081 | 174/87 |
| 2013/0168956 A1 * | 7/2013 | Sisk | F16L 41/021 | 285/126.1 |
| 2013/0294817 A1 * | 11/2013 | Augustsson | F16B 7/185 | 403/217 |
| 2014/0084581 A1 * | 3/2014 | Sisk | F16L 37/18 | 285/312 |
| 2014/0110932 A1 * | 4/2014 | Gramling | B65D 90/623 | 285/126.1 |
| 2014/0167404 A1 * | 6/2014 | Wilson | G10G 5/00 | 285/61 |
| 2014/0223745 A1 * | 8/2014 | Eberhart | F16B 7/044 | 29/897.31 |
| 2015/0240846 A1 * | 8/2015 | Rogers | F16B 7/048 | 248/230.4 |
| 2015/0260289 A1 * | 9/2015 | Peters | F16B 7/04 | 403/288 |
| 2016/0131290 A1 * | 5/2016 | Linhorst | F16L 29/007 | 251/279 |

* cited by examiner

MULTIPURPOSE CONNECTOR SYSTEM

TECHNICAL FIELD OF THE INVENTION

The present invention relates to a connector system for forming structural interconnections between a structural body, such as a planar structure, rigid structure, or a box structure, to a system of cylindrical pipes, tubes, or other structural component. For example, the connector system is a versatile system of connectors that can attach a structural body, such as a Vesa-mount style monitor, or a storage box, or a planar surface to a system of pipes or mountable wheels. The connectors in the connector system have the capability to create easily engageabe and disengageable connections between separate structural components without the destructive wear in conventional connectors, and at the same time allow for the passage of wires through a hollow center system that runs throughout the hollowed center sections of each connector. More specifically, but not exclusively, the invention relates to a connector system which allows for a variety of interconnections and are capable of providing a routing system for wires through the hollow centers.

BACKGROUND OF THE INVENTION

This invention relates to a versatile system of connectors and methods for securing various types of pipes, tubes, and enclosed structures to planar or rigid work surfaces, or wheels. The planar or rigid surface can include, but not limited to, a display screen or a storage box. Conventional connectors, couplers, and pipe fittings are well known in the industry. Various types of fittings, such as elbow connectors, on-axis couplings, and crosses are used for pipes, rods, and tubes in thousands of existing industries. The plumbing industry is an example wherein pipes are often individually routed for purposes of creating efficient pathways in a home or business.

One of the shortcomings of conventional connectors, couplers, and fittings is its inability to efficiently create a free-standing independent structure with multiple interconnecting pipes, or tubes with each other while at the same time providing attachment capabilities to planar or rigid surfaces. A further problem with existing technology is its inability to contain any means to carry wires or cables within its hollow bodies while at the same time providing a way to secure attachments. The history of companies and technological advances involved in manufacturing couplings, elbows, tee fittings, and cross fittings is rich and long. U.S. Pat. No. 20,717 with an issuance date of Jun. 29, 1958 shows a conventional pipe coupling. More modern advances, such as U.S. Pat. No. 5,687,994 to Hansen issued Nov. 18, 1997, disclose improved capabilities to connect various types of pipes and rods. But none of the current existing technologies has made any advancement to improve its versatility by providing multiple interconnection capabilities while at the same time allowing access for wires or cables to be routed through the interior cavities of the interconnected pipes and tubes. And none of the current existing technologies provides a universal interface capable of various, miscellaneous attachments.

Conventional adapter flanges used with couplings, elbows, and crosses, such as the adapter flange coupling disclosed by Roche in Des. 263,415 issued on Mar. 16, 1982 shows how two rods can be tightly attached with a flanged component that allows for structural securement. U.S. Pat. No. 1,864,339 to Church issued Apr. 16, 1929 and U.S. Pat. No. 3,761,114 to Blakely issued on Sep. 25, 1973 discloses further types of flanged coupling that allows for securement with conventional screws. Other conventional types of pipe couplings allow the use of clamps, such as U.S. Pat. No. 6,050,615 to Weinhold issued Apr. 18, 2000. Some other types of clamps involve using only one type of internal thread, which eliminates the need for a nut wherein a socket head cap crew or bolt is all that is needed to tighten the flanges. Many of these conventional couplings are limited to particular uses and do not allow for the adaptability to be used with other types of pipe sizes and pipe materials other than the particular ones that they were designed for.

Popular clamp systems, such as Kee Klamp or Kee Lite systems are made for pipe railing fittings and slip-on pipe fittings. For example, Pub. No. EP 1293686 B1 assigned to Kee Klamp discloses a connector for modular safety rail. The application discloses a free standing connector for modular safety rail assemblies and other applications. These connectors are designed for common industrial schedule piping usage, and the connectors rely on a fastener design that causes damage on the pipes; the damage to the pipes will increase with use and reuse over time. The impact of the piping fasteners will dig into the pipes, ultimately wearing down the pipe components. These fasteners are also not intended for thin-walled metal tubing (EMT) and they are completely incompatible with plastic PVC piping. Over time, these areas of damage caused by the fasteners often prove to be the weak areas vulnerable to breakage and failure. These clamp systems do not have a flat surface for the attachment of planar components, such as VESA-compatible interface.

Various mounting systems exist for the attachment of rods to planar surfaces, such as multimedia displays. U.S. Publication No. 2008/0105804 to Horner et al. discloses a conventional mounting system for the attachment of a pole 22 to a planar surface, such as display screen, flat-screen, video screen, computer screen, tablet screen, or a VESA screen. Various conventional mounting systems, such as the VESA compliant mounting hole patterns allow for a large configuration of systems to be attached to various rod or tube systems. The use of conventional couplings and fittings for these uses has shortcomings. First, the conventional couplings and fittings do not have the versatility to be used in multiple different capacities other than the specific capacity they were designed for. Second, the conventional couplings and fittings do not have the capability to carry electrical or wiring systems or cables through the connector wall, which are necessary to a number of different modern uses, such as display mounts for both visual aesthetics and safety.

What is needed is a system of connectors that allows the flexibility of multiple interconnections, such that the connectors allow for numerous types of connection capabilities without the conventional destructive features of fasteners, while at the same time being able to directly attach to rigid or planar surfaces and providing a routing pathway through the connector wall for giving access for a wiring or cable system through the internal cavity. What is further needed is a system of multi-connectors that is strong enough to create a free-standing independent structure and to allow enhanced safety and increased visual aesthetics by protecting and hiding wires and cables within its interior cavity.

SUMMARY OF THE INVENTION

An object of the present invention is to provide an improved system of adaptors, connectors, fittings, couplings, pipes, and tubes that allows for easy mounting of various rigid and planar surfaces. The system allows for the creation of free-standing independent structures and frames, and it further allows for the ability to connect to stem casters, or mountable wheels, that will allow the structure or frame to be mobile. In some of the preferred embodiments of the present invention, a plurality of independent adapters, or connectors, is provided that allows for thousands of different connection capabilities with each other and with other planar or rigid surfaces.

Another object of the present invention is to provide a multipurpose connector system that allows for a safer, more efficient means to carry cabling inside its hollow body, such as electrical cables. By creating passageways within the hollow bodies between the multipurpose connectors, the cables are protected and allows for improved safety and better organization in complex connector systems.

Another object of the present invention is to provide a more versatile and easy securement methods, such as the ability to attach via clamping action, multiple pipes together. By providing a flanged clamping/tightening system, the individual multipurpose connector can connect new and used pipes and tubes with conventional screws, bolts, or fasteners, or various types of single clamp fasteners. By shear versatility of each connector, the system can be adapted for use with recycled pipes. While conventional connector systems have all independently been able to carry some of these features, one of the unexpected values from a combination of these capabilities is the efficiency, the use of less surrounding space, and ability to protect and organize the wiring or cable system within its connector system.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the present invention are directed to a variety of uses capable of utilizing the multipurpose connector system. The multipurpose connector system can be used in free-standing independent structures that include various types of mounting systems or structural frames. The multipurpose connector system can be used in a number of technical and industrial areas, including aerospace, automotive, government contract, educational facilities, medical clinics, hospitals, and other areas. Examples of such include, but not limited to, work surfaces, such as beds, tables, mobile or stationary workstations, service carts, hospital beds, medical examination tables, mobile or stationary storage containers, automobile parts (e.g., fenders, bumpers, engine parts, electronics, interior parts, etc. . . . ), workstations for assembly/disassembly in manufacturing lines, and various types of tables, including retail display tables, as well as point-of-sale tables. Various outdoor structures, such as playscapes and plant/flower displays and playground structures, are appropriate for various embodiments of the present invention. Other furniture components, mobile and stationary carts and chests, are also disclosed. One example of use is the mounting system for multimedia displays, such as computer displays, and televisions with VESA-type mounts. The multipurpose connector system can be used in a number of areas, including commercial, industrial, retail environments, as well as medical, educational, home business, or personal design industries. In all of these industries, there is a particular need for versatile, multipurpose, adaptable connector systems that would allow for better securement of poles, pipes, and tubes to each other and for the attachment of them to planar or rigid surfaces or structures. In all of these industries, there is a particular need for systems capable of connecting without the use of damaging fasteners and there is a particular need for the protection of wires and cables that often are found with or near these systems.

The connector system of the present system discloses the use of various individual adapters that are used both singly or in multiples that interface two to six or more cylindrical bodies. Cylindrical bodies include pipes, tubes, or structural components that are capable of supporting various mounting structures as discussed above. In all cases, the various connectors, or adapters, act as an interface to connect these cylindrical bodies to each other or to other rigid or planar surfaces, such as display mounts, e.g., VESA compatible mounts. In addition, some offer support for mounting ubiquitous stem caster type wheels. Various types of cylindrical bodies are considered, including bodies that have a diameter or more than 2.5 inches, such as "schedule xx" piping, PVC and Lexan® piping (including clear and colored variations), slip fit and welding pipes, and clamping pipe system. The cylindrical bodies are composed of various types of metals (i.e., cast iron), plastics, or even glass.

In one embodiment, the multipurpose connector system that allows for versatility is comprised of less than 10 independent adapters, which provides thousands of different connection possibilities and applications. In most cases, only one to four pieces are needed. For example, just one on-axis connector is needed to mount a horizontal work surface, such as a flat screen, to a conventional VESA mount. The connector system of the present system allows for the full customization for the given situation.

Conventional coupling and connector systems use a combination of elbow connectors, on-axis coupling, union coupling, reducer adapter, olets/bungs, tee connector, cross connector, cap, plug, nipple, barb, and valves to provide conventional connection systems. The embodiments of the present invention are directed to replace all of these conventional connectors with less than ten much more versatile independent connectors.

Figure 7:
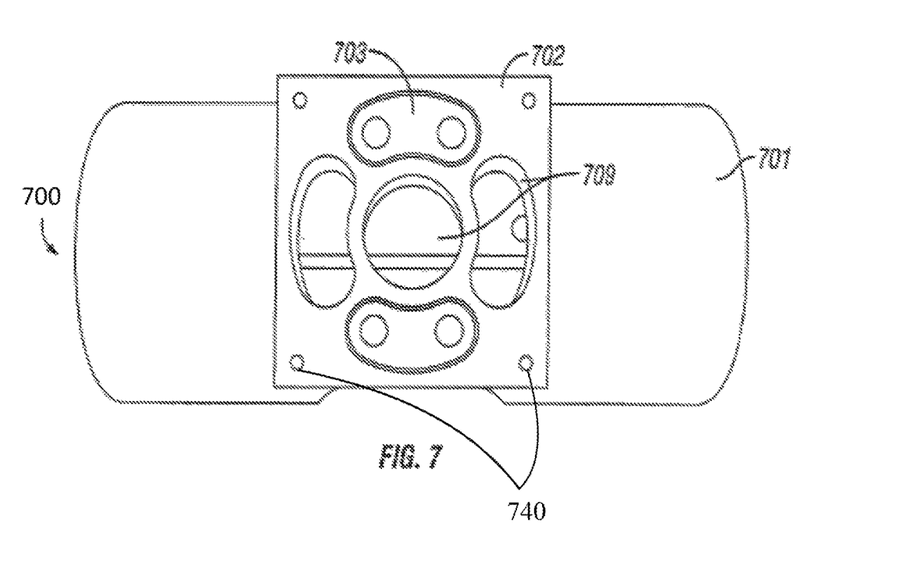
FIG. 7 shows a top view of an on-axis connector in accordance with one embodiment of the present invention.

FIG. 7 discloses a top view of an on-axis connector (700) having a first body (701). The first body (701) can be composed of any type of plastic, metal, or glass capable of being molded and having the durability to tightly make connections to various sized cylindrical bodies, such as pipes, and poles made plastic, metal, glass, wood, or rubber. The preferred embodiment of the present invention utilizes metal made from stainless steel, aluminum, copper, chrome-plated bronze, or other metal composition, such as zinc alloys or PVC plastic if costs are a consideration. The first body (701) has a hollow center (707) that is capable of carrying a number of different wires or strings, such as electrical wiring. The first body is tubular in shape and has two receiving ends on both sides of the first body. The receiving ends are shaped to receive the pipes, tubes, or poles. The first body has a planar surface (702). Planar surface (702) is capable of making an attachment to a rigid or planar structure, such as a display screen, or VESA screen. The planar surface has an attachment means (740). The attachment means (740) includes holes to fit conventional screws, nuts and bolts, or any other type of fastener. Hole ((703) can accept a variety of fasteners and pass cable/wires, but also supports stem caster (wheel) mounts. The attachment means (740) is adapted to fit various structures. For example, VESA standard calls for mounting interface standards having specific distances between holes. The attachment means (740) can be adapted to fit the VESA standards. The attachment means is also capable of fitting other rigid structures.

The first body (701) has an annular cross-section (not shown) that does not completely circle the tubular body. The first body (701) has a tightening system (704) that is comprised of two flanges. Both flanges are spaced so that the first body receiving ends can utilize the connector design and the connector material's ability to flex easily allows for easy tightening/clamping the fit to other cylindrical bodies of different diameter sizes. The cylindrical bodies will generally have a diameter smaller than the diameter of the receiving ends. The tightening system (704) is made so that the diameter of the receiving ends gets smaller when the tightening system (704) is used. The tightening system includes at least one set of holes (705) that are aligned on each flange. The holes can be conventionally sized to fit nuts and bolts, screws, or other type of fasteners, or be threaded to eliminate the need for any mating nut at all. Clamping fasteners can also be used to enable the tightening system (704), which includes various clamp systems that utilize a quick release, one-step clamp. In the preferred embodiment of the present invention, the tightening system is composed of two sets of flanges that are aligned with one or more sets of fastener holes. The fastener holes go through each set of flanges, and may or may not include a recessed area in order to fit conventional nuts and bolts.

The first body (701) includes a hollow center (707) that is capable of fitting conventional wires and cables used for various purposes. For example, to mount a multimedia display, there is a need to efficiently run the wires or cables of the display to connect the multimedia display. The embodiments of the present invention allow the usage of the hollow center (707) to carry and hold the electrical wires. To efficiently hold the wires within the connect system also provides organization and aesthetic value due to the fact that it does not run along the side or outside the connector system. The usage of the hollow center proves additional unexpected value in that it creates protection for the wires. One of the unexpected values in the current system is that the pipes and tubes that are made with metal eliminate any EMI radiation emanating from the wiring and cables. For example, in conventional VESA mounts, the mounts are generally adaptable for different arrangements so that the TV can be angled to different directions. The movement of the TV can sometimes tangle with the wiring (cables and electrical wiring). By allowing the coupling and connector system to run the wires within the hollow center, the system provides protection of the cables and the wires.

In accordance with the embodiments of the present invention, the hollow center is utilized by creating a passageway (709) so that the wires and cables can enter the hollow center. Each chamber which accommodates each pipe has no internal obstruction preventing wire passage/access to other similar chambers. The passageway (709) is sized to fit at least one wire, and preferably multiple wires, as needed, as well as allow passage of a typical AC power plug. The passageway (709) has an approximate diameter of ⅝" but other sized holes are considered depending on the particular need. The passageway (709) can also be differently shaped, such as kidney shaped. Kidney shaped passageways allow for the creation of voids that is helpful in the casting processing during manufacture. These passageways can be used for other purposes, such as routing cable. For example, in the VESA mounting system, the hole is located directly on the flat surface (702) so that the cable wires from the TV can directly enter the hollow center of the first body (701) near the attachment means (740).

Figure 8:
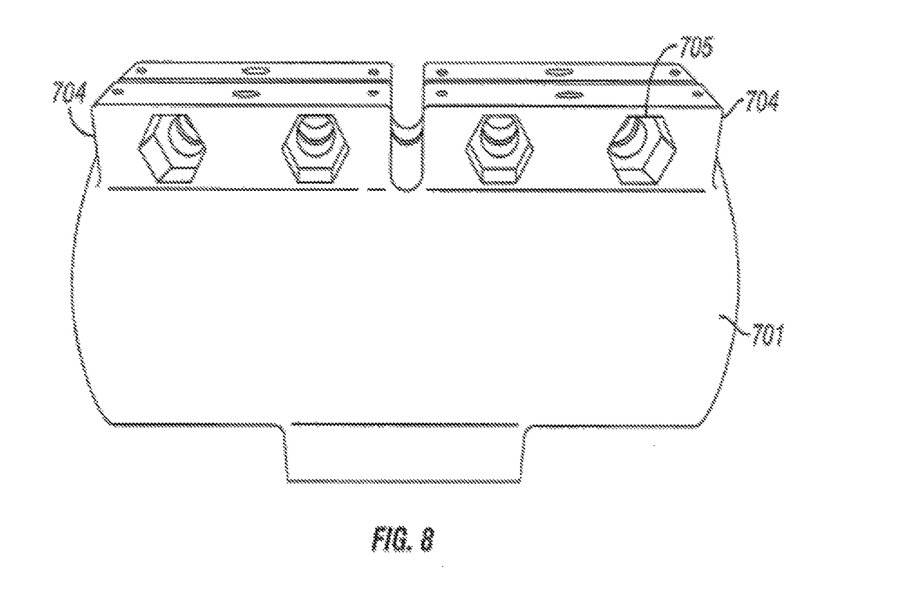
FIG. 8 shows a side view of an on-axis connector in accordance with one embodiment of the present invention.
Figure 12:
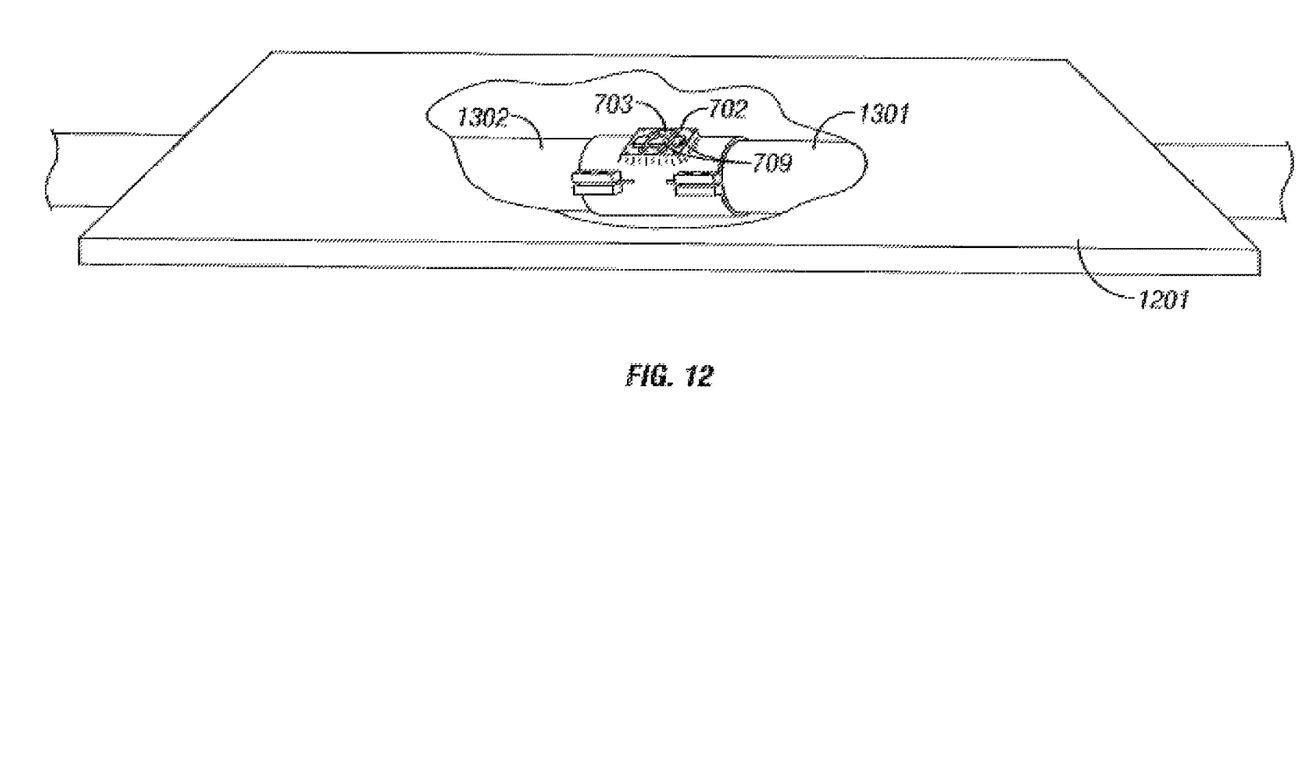
FIG. 12 shows an on-axis connector connected to a flat body and a cylindrical body in accordance with one embodiment of the present invention.
Figure 13:
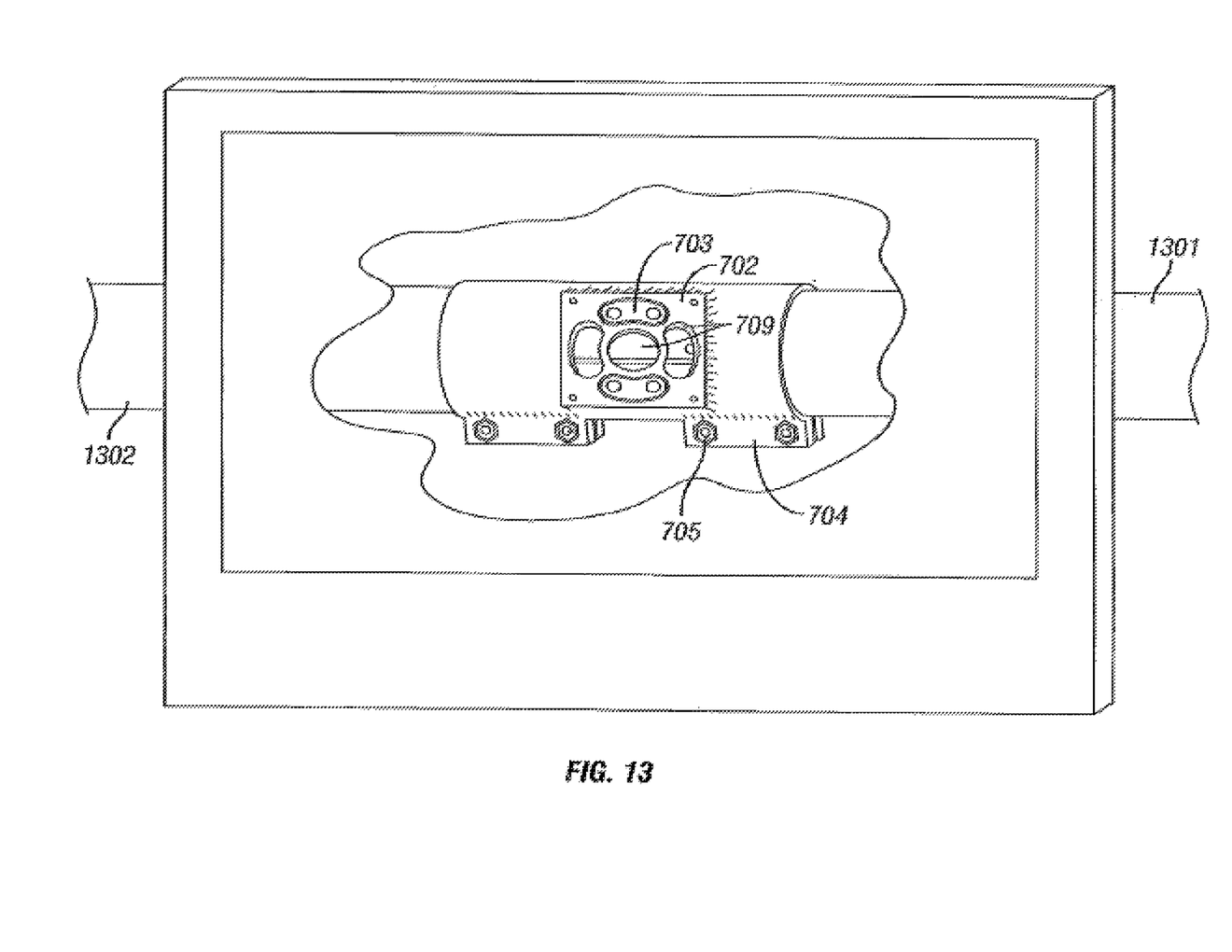
FIG. 13 shows a side view of an on-axis connector connected to a flat body and a cylindrical body in accordance with one embodiment of the present invention.

The first body (701) has two receiving ends, but the first body (701) is capable of holding one or two separate cylindrical bodies. FIG. 8 shows a side view of the same on-axis connector. The recessed area of the hexagonal holes in the tightening system (704) is better shown. FIG. 12 shows a side view of the on-axis connector having a flat surface (702) that is attached to a planar body (1201). The planar body can be a multimedia display, but it is not limited to this embodiment. Other types of planar surfaces, such as furniture tables, storage boxes, beds, exercise equipment, safety rails, hand rails, and playground components are considered. The attachment of the flat surface (702) can also make attachments to rigid structures as long as the rigid structures have at least one aligning attachment means. FIG. 13 shows a frontal view of the interior cut out showing the tightening system (704) connected to pipe (1301).

Figure 4:
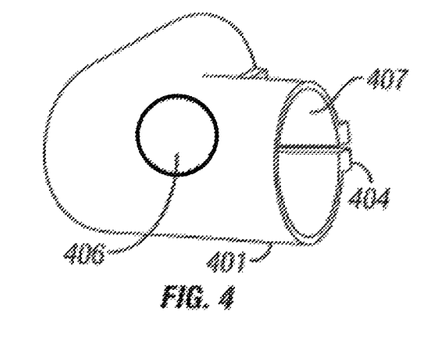
FIG. 4 shows an elbow connector in accordance with one embodiment of the present invention.

FIG. 4 shows the next independent structure in accordance with the embodiments of the present invention. An elbow connector (401) is disclosed that is capable of attaching two separate cylindrical bodies that are pipes or tubes made of materials and having the dimensions discussed above. The elbow connector (401) has a hollow center (407) that is able to carry wires and strings as discussed extensively above. The elbow connector (401) also has a hole (406) that is capable of receiving the wires and strings as well as passing an electrical connector. The elbow connector (401) also has flanged tightening system (404) with the capability to decrease the diameter size of the receiving ends in much the similar methods as discussed above regarding the on-axis connector. The elbow connector (401) has receiving ends that are orthogonal to each other such that when the cylindrical bodies are attached to the elbow connector, the cylindrical bodies are at 90° angles.

Figure 5:
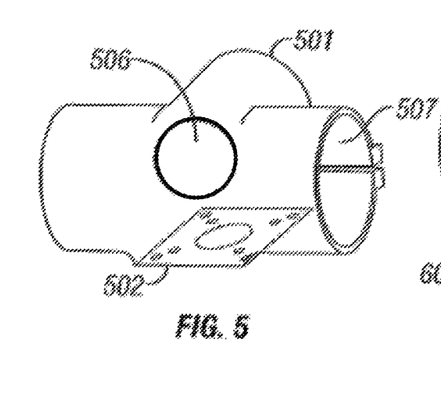
FIG. 5 shows a tee joint connector in accordance with one embodiment of the present invention.

FIG. 5 discloses the next connector in the multipurpose connector system. A T-joint connector (501), or tee joint connector, is disclosed in accordance with the embodiments of the present invention. The T-joint connector (501) is capable of attaching up to three separate cylindrical bodies that are pipes or tubes made of materials and having the dimensions discussed above. The T-joint connector (501) has a hollow center (507) that is able to carry wires and strings as discussed extensively above. The T-joint connector (501) also has a hole (506) that is capable of receiving the wires and strings in much the similar fashion to hole for the on-axis connector (701). The T-joint connector (501) also includes a flat surface (502) that is capable of attachment with rigid or planar structures in the same capacity as the flat surface (702) of the on-axis connector (701) discussed extensively above. The T-joint connector (501) has a tightening system with flanges that has the same capabilities of the flanged tightening system (704) discussed extensively with the on-axis connector (701). The receiving ends of the T-joint connector are capable of making attachments with three cylindrical bodies that are most typically useful orthogonal and planar but could be any angle/orientation.

Figure 1:
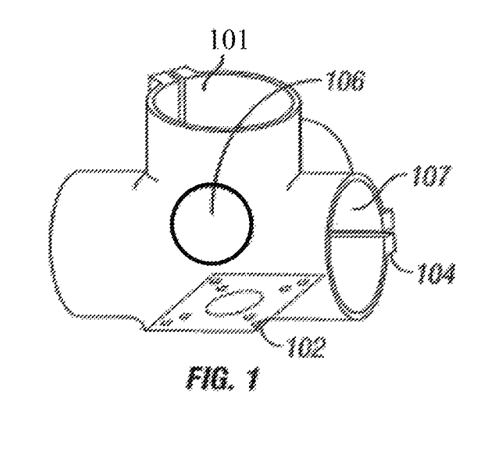
FIG. 1 shows corner tee connector in accordance with one embodiment of the present invention.

FIG. 1 shows the next connector in the multipurpose connector system. The corner T-joint connector (101) is disclosed in accordance with the embodiments of the present invention. The corner T-joint connector (101) is capable of attaching up to four separate cylindrical bodies that are pipes or tubes made of materials and having the dimensions discussed above. The corner T-joint connector (101) has a hollow center (107) that is able to carry wires and strings as discussed extensively above. The corner T-joint connector (101) also has a hole (106) that is capable of receiving the wires and strings in much the similar fashion to hole (709) for the on-axis connector (701). The corner T-joint connector (501) also includes a flat surface (102) that is capable of attachment with rigid or planar structures in the same capacity as the flat surface (702) of the on-axis connector (701) discussed extensively above. The corner T-joint connector (501) has a tightening system with flanges that has the same capabilities of the flanged tightening system (704) discussed extensively with the on-axis connector (701). The receiving ends of the corner T-joint connector are capable of making attachments with up to four cylindrical bodies that are orthogonal and three of the receiving ends are planar.

Figure 2:
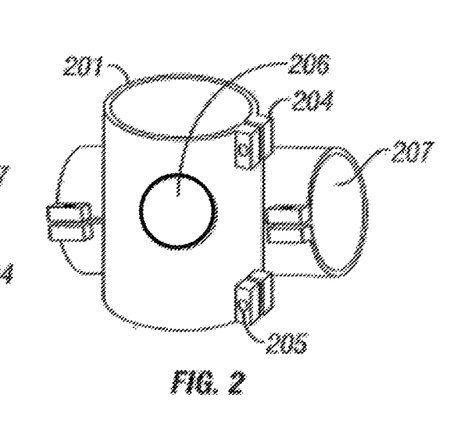
FIG. 2 shows a cross over connector in accordance with one embodiment of the present invention.

FIG. 2 shows the next connector in the multipurpose connector system. The crossover connector (201) is disclosed in accordance with the embodiments of the present invention. The crossover connector (201) is capable of attaching up to four separate cylindrical bodies that are pipes or tubes made of materials and having the dimensions discussed above. It can also connect two cylindrical bodies that run through the hollow centers. The crossover connector (201) has two hollow centers (207) that are able to carry wires and strings as discussed extensively above. The crossover connector (201) also has a hole (206) that is capable of receiving the wires and strings from one hollow center to the other hollow center and has the same size and capabilities to hole (709) for the on-axis connector (701). The crossover connector (201) has a tightening system (204) with flanges that has the same capabilities of the flanged tightening system (704) discussed extensively with the on-axis connector (701). As shown in FIG. 2, the flanged system shows an embodiment with only one nut and bolt hole (205) on each flange. The flange can be located to the side or directly facing each of the tubular body. As shown in FIG. 2, both examples of a tightening system with flanges to the side and flanges facing the other tubular body are disclosed. The receiving ends of the crossover connector (201) are capable of making attachments with up to four cylindrical bodies and can be arranged so that they are perpendicular and overlapping each other.

Figure 3:
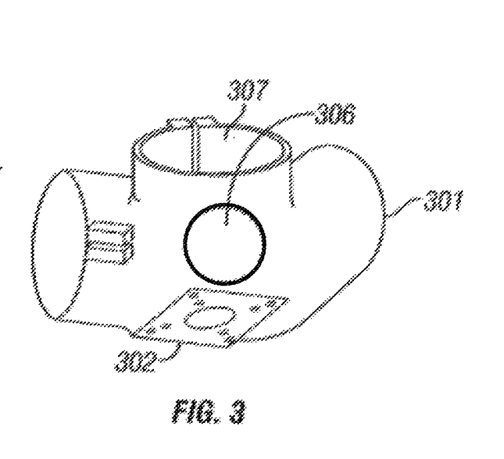
FIG. 3 shows a corner joint connector in accordance with one embodiment of the present invention.

FIG. 3 shows the next connector in the multipurpose connector system. The corner joint connector (301) is disclosed in accordance with the embodiments of the present invention. The corner joint connector (301) is capable of attaching up to three separate cylindrical bodies that are pipes or tubes made of materials and having the dimensions discussed above. The corner joint connector (301) a hollow center (307) that is able to carry wires and strings as discussed extensively above. The corner joint connector (301) also has a hole (306) that is capable of receiving the wires and strings in the same capacity to hole (709) for the on-axis connector (701). The corner joint connector (301) has a tightening system with flanges that has the same capabilities of the flanged tightening system (704) discussed extensively with the on-axis connector (701). As shown in FIG. 3, the flanged system only discloses one set of flanges for each receiving end. The receiving ends of the corner joint connector (301) is capable of making attachments with up to three cylindrical bodies wherein all three cylindrical bodies are orthogonal to each other and wherein two of the cylindrical bodies are planar.

Figure 6:
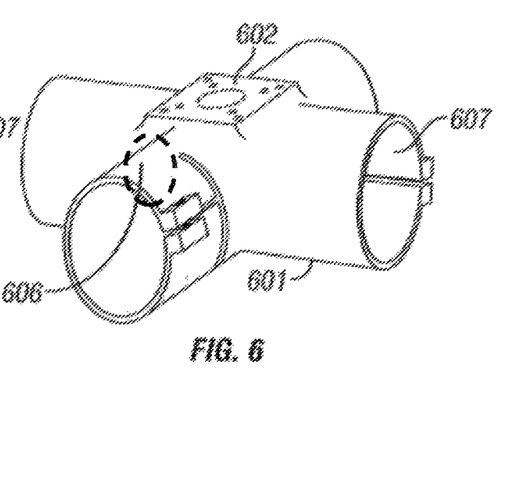
FIG. 6 shows a cross connector in accordance with one embodiment of the present invention.

FIG. 6 shows the next connector in the multipurpose connector system. The cross connector (601) is disclosed in accordance with the embodiments of the present invention. The cross connector (601) is capable of attaching up to four separate cylindrical bodies that are pipes or tubes made of materials and having the dimensions discussed above. The cross connector (601) has a hollow center (607) that is able to carry wires and strings as discussed extensively above. The cross connector (601) also has a hole (606) that is capable of receiving the wires and strings in the same capacity to hole (709) for the on-axis connector (701). The cross connector (601) also includes a flat surface (602) that is capable of attachment with rigid or planar structures in the same capacity as the flat surface (702) of the on-axis connector (701) discussed extensively above. As with the corner T-connector (101) and the corner joint connector (301) and the T-connector (501), the flat surface (602) has a hole for within the flat surface in addition to the hole (606) and has the same capabilities of the hole (709) on the flat surface (702) in the on-axis connector (701). The cross connector (601) has a tightening system with flanges that has the same capabilities of the flanged tightening system (704) discussed extensively with the on-axis connector (701). The receiving ends of the cross connector (601) is capable of making attachments with up to four cylindrical bodies wherein all the receiving ends are orthogonal to each other and wherein all the receiving ends are on one plane.

Figure 9:
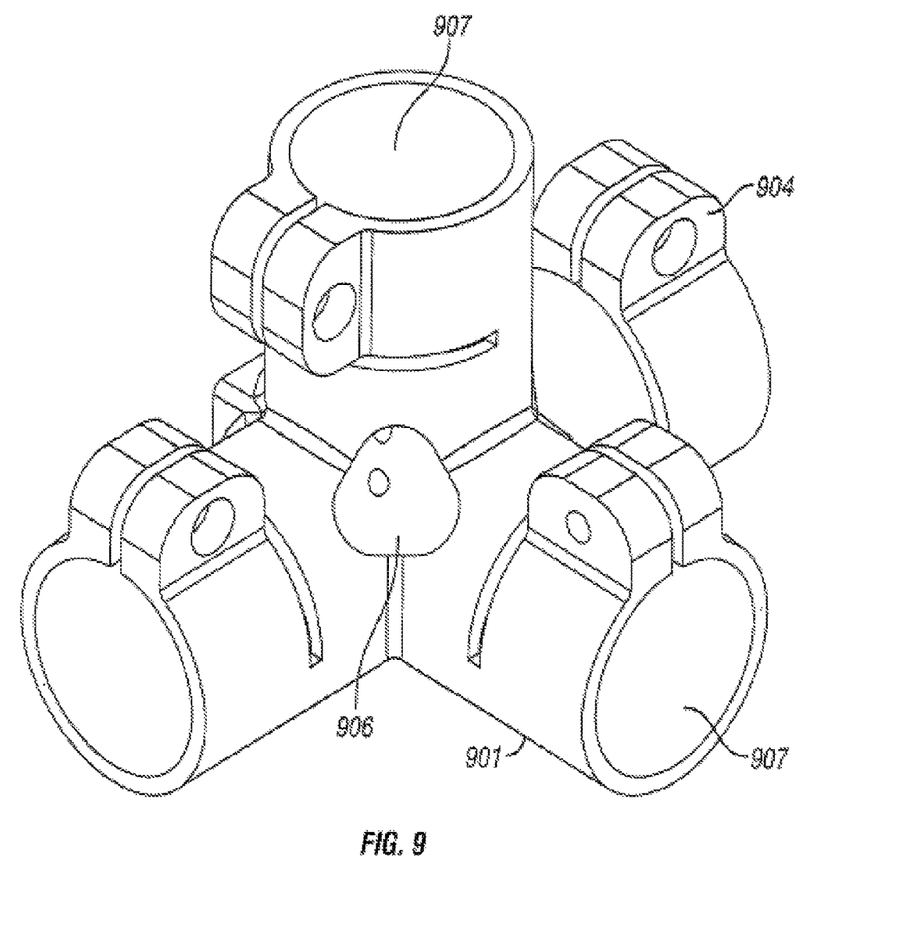
FIG. 9 shows a four socket corner joint connector in accordance with one embodiment of the present invention.
Figure 10:
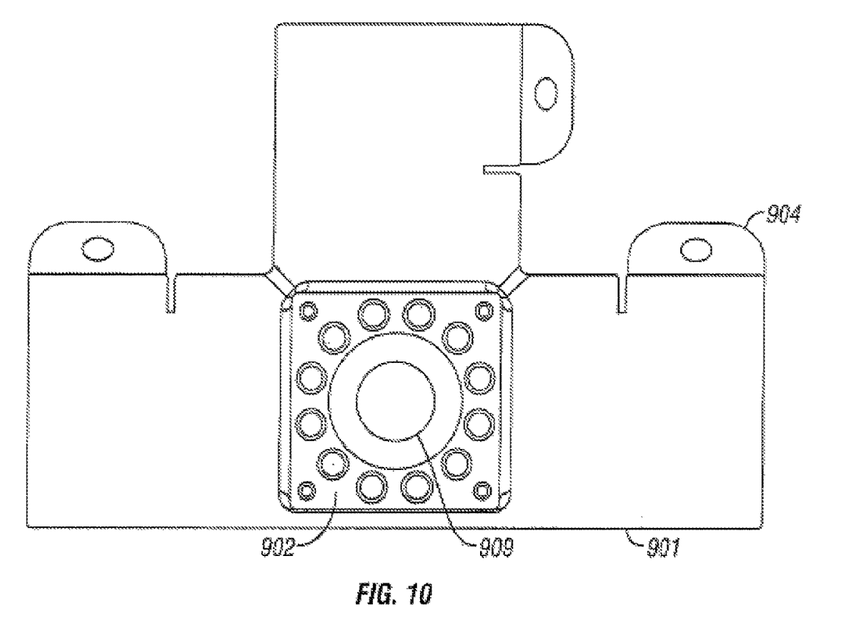
FIG. 10 shows a side view of the four socket corner joint connector in accordance with one embodiment of the present invention.

FIG. 9 shows an angled view of the next connector in the multipurpose connector system. The four socket cross connector (901) is disclosed in accordance with the embodiments of the present invention. The four socket cross connector (901) is capable of attaching up to four separate cylindrical bodies that are pipes or tubes made of materials and having the dimensions discussed above. The four socket cross connector (901) has a hollow center (907) that is able to carry wires and strings as discussed extensively above. The four socket cross connector (901) also has a hole (906) that is capable of receiving the wires and strings in the same capacity to hole (709) for the on-axis connector (701). The four socket cross connector (901) also includes a flat surface (902) that is shown FIG. 10, which shows a side view of the four socket cross connector (901). The flat surface (902) is capable of attachment with rigid or planar structures in the same capacity as the flat surface (702) of the on-axis connector (701) discussed extensively above. As with the corner T-connector (101) and the corner joint connector (301) and the T-connector (501), the flat surface (602) has a hole within the flat surface in addition to the hole (906) and has the same capabilities of the hole (709) on the flat surface (702) in the on-axis connector (701). The four socket cross connector (901) has a tightening system with flanges that has the same capabilities of the flanged tightening system (704) discussed extensively with the on-axis connector (701). The receiving ends of the four socket cross connector (901) is capable of making attachments with up to four cylindrical bodies wherein all the receiving ends are orthogonal to each other and wherein three of the receiving ends are on one plane.

Figure 11:
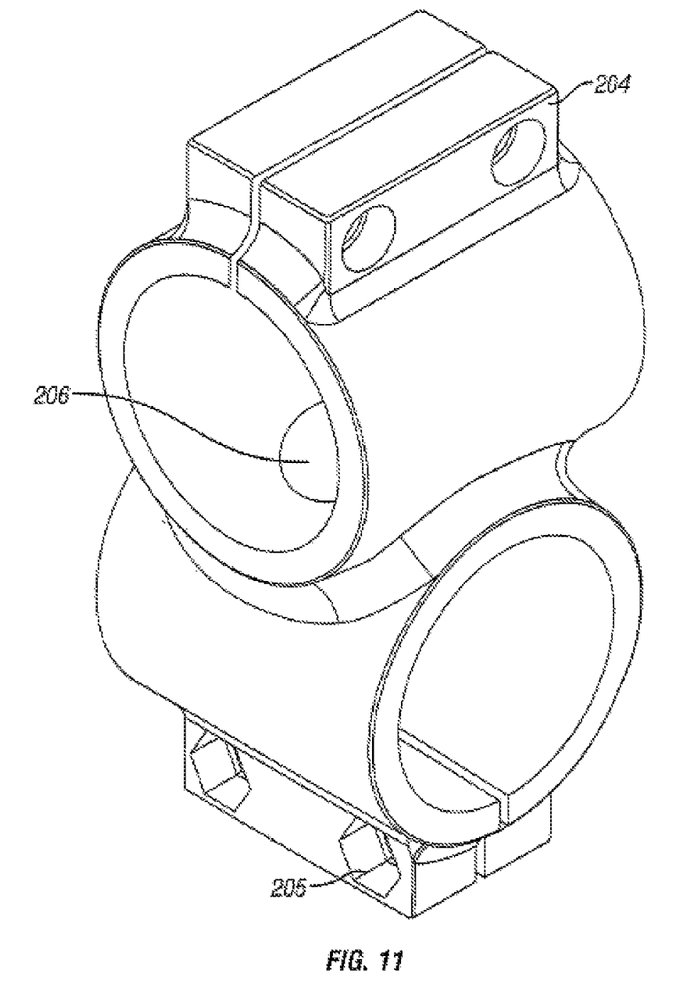
FIG. 11 shows another embodiment of the crossover connector shown in FIG. 2 in accordance with one embodiment of the present invention.

FIG. 11 shows a different embodiment of the cross-over connector shown in FIG. 2. This embodiment shows only one set of flanges for the tightening system and runs fully lengthwise along the tubular bodies. The top flange discloses two sets of circular holes as the attachment means for the purpose of receiving circular nuts and bolts. The bottom flange discloses two sets of hexagonal holes as the attachment means for the purpose of receiving hexagonal nuts and bolts.

As a whole system, the independent connectors 701, 401, 501, 601, 101, 201, 301, and 901 are eight connectors that are capable of virtually any arrangement. The receiving ends of each of these connectors are capable of making tight attachments with the pipes or tubes in a manner consistent with usages in furniture, automotive, medical, or other types of businesses industries. The arrangement of the holes that are capable of receiving wires and strings in accordance with the different potential uses allow for each of the connectors to rout these wires and strings internally within the hollow centers of each connector without ever having to ever rout the wires externally.

Figure 14:
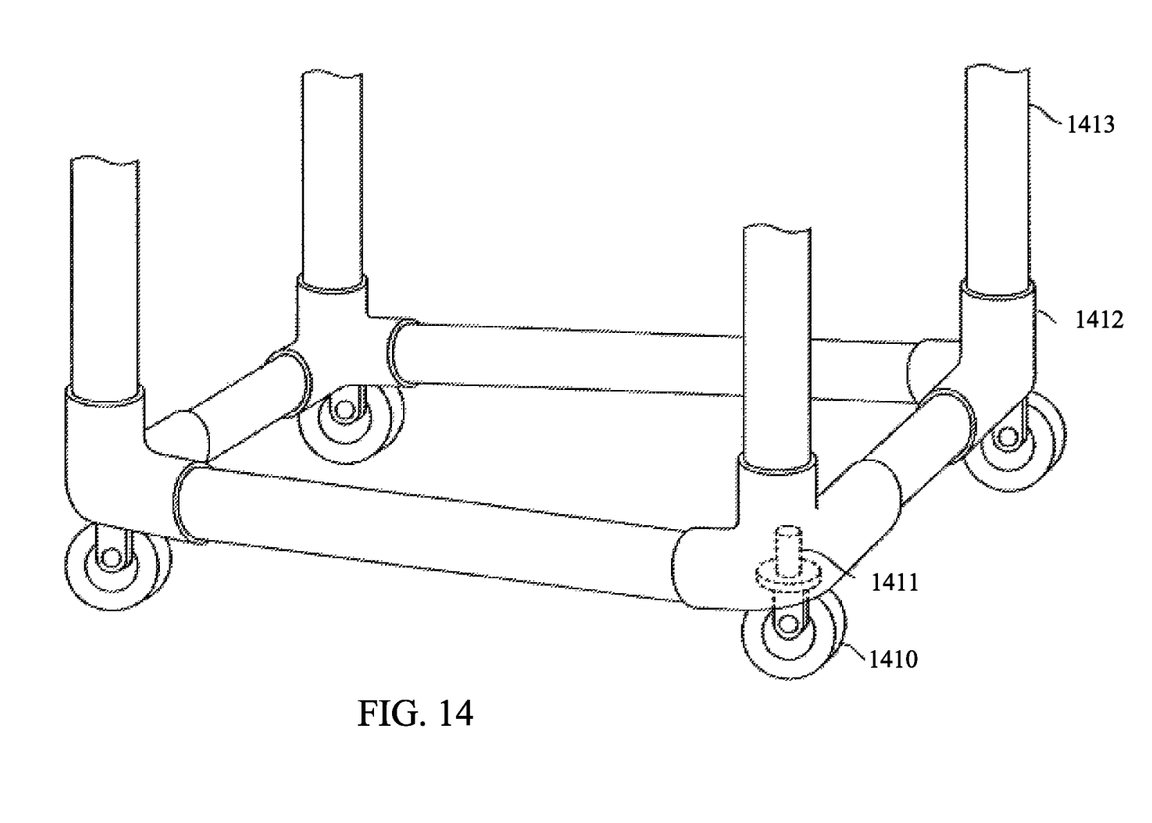
FIG. 14 shows an embodiment of a connector system that is used in a mobile table desk utilizing the stem caster (wheels).

FIG. 14 shows another embodiment of the current system including connectors (1412) connected to the pipe system (1413) in accordance with the concepts of the current invention. The stem caster wheel (1410) is attached with a stem caster wheel base (1411) that is attached to one of the opening in the connector (1412). The stability of the stem caster wheel (1410) is strengthened by the use of the hollow cavity that exists in the connector (1412) and the fitting of the stem caster wheel base (1411) to the opening in the connectors (1412)(not shown).

Although the present invention and its advantages have been described in detail, it should be understood that various changes, substitutions and alterations can be made herein without departing from the spirit and scope of the invention as defined by the appended claims. For example, although the receiving ends of these various connectors are substantially arranged in orthogonal angles to each other, other types of oblique angles are contemplated. The different angles can be made in accordance with the specific need. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A coupling device for forming structural interconnections with members having a circular cross-section and structures having a flat surface; comprising:

a hollow body with an open interior, the body including a planar face for connection to a structure with a flat surface, the planar face having fastener holes to receive fasteners to secure the body to the structure, the planar face having a first opening to provide access to the interior of the body to receive wires or cords from the structure;

a first cylindrical connector having a length extending along a first axis with an open free end for receiving a tube or rod, the open free end providing access to the interior of the body, the first cylindrical connector having a slit extending from the free end along a portion the length of the first cylindrical connector and a flange located on each side of the slit in an opposing relationship and extending along a portion of the length of the first cylindrical connector, each flange having at least one hole aligned with a hole on the opposite flange to receive a fastener to draw the opposed flanges together and decrease the diameter of the first cylindrical connector;

a second cylindrical connector having a length extending along the first axis with an open free end for receiving a tube or rod, the open free end providing access to the interior of the body, the second cylindrical connector having a slit extending from the free end along a portion the length of the second cylindrical connector and a flange located on each side of the slit and extending along a portion of the length of the second cylindrical connector, each flange having at least one hole aligned with a hole on the opposite flange to receive a fastener to draw the opposed flanges together and decrease the diameter of the second cylindrical connector; and a third cylindrical connector having a length extending along a second axis with an open free end for receiving a tube or rod, the open free end providing access to the interior of the body, the third cylindrical connector having a slit extending from the free end along a portion the length of the third cylindrical connector and a flange located on each side of the slit and extending along a portion of the length of the third cylindrical connector, each flange having at least one hole aligned with a hole on the opposite flange to receive a fastener to draw the opposed flanges together and decrease the diameter of the third cylindrical connector.

2. The coupling device of claim 1, wherein the body includes a second opening to provide access to the interior to receive wires or cords from an attached structure.

3. The coupling device of claim 1, wherein the third cylindrical connector is at an angle of about 90 degrees with respect to the first and the second cylindrical connectors.

4. The coupling device of claim 3, further including a fourth cylindrical connector having a length extending along an axis with an open free end for receiving a tube or rod, the open free end providing access to the interior of the body, the fourth cylindrical connector having a slit extending from the free end along a portion the length of the fourth cylindrical connector and a flange located on each side of the slit and extending along a portion of the length of the fourth cylindrical connector, each flange having at least one hole aligned with a hole on the opposite flange to receive a fastener to draw the opposed flanges together and decrease the diameter of the fourth cylindrical connector.

5. The coupling device of claim 4, wherein the fourth cylindrical connector is at an angle of about 90 degrees with respect to the third cylindrical connector.

6. The coupling device of claim 4, wherein the third cylindrical connector and the fourth cylindrical connector extend along the same axis.

7. A coupling device for forming structural interconnections with members having a circular cross-section and structures having a flat surface; comprising:
- a hollow body with an open interior, the body including a planar face for connection to a structure with a flat surface, the planar face having fastener holes to receive fasteners to secure the body to the structure, the planar face having a first opening to provide access to the interior of the body to receive wires or cords from the structure;
- a first cylindrical connector having a length extending along a first axis with an open free end for receiving a tube or rod, the open free end providing access to the interior of the body, the first cylindrical connector having a slit extending from the free end along a portion the length of the first cylindrical connector and a flange located on each side of the slit in an opposing relationship and extending along a portion of the length of the first cylindrical connector, each flange having at least one hole aligned with a hole on the opposite flange to receive a fastener to draw the opposed flanges together and decrease the diameter of the first cylindrical connector; and
- a second cylindrical connector having a length extending along a second axis with an open free end for receiving a tube or rod, the open free end providing access to the interior of the body, the second cylindrical connector having a slit extending from the free end along a portion the length of the second cylindrical connector and a flange located on each side of the slit and extending along a portion of the length of the second cylindrical connector, each flange having at least one hole aligned with a hole on the opposite flange to receive a fastener to draw the opposed flanges together and decrease the diameter of the second cylindrical connector; wherein the first cylindrical connector extends at an angle of about 90 degrees with respect to the second cylindrical connector.

8. The coupling device of claim 7, further including a third cylindrical connector having a length extending along an axis with an open free end for receiving a tube or rod, the open free end providing access to the interior of the body, the third cylindrical connector having a slit extending from the free end along a portion the length of the third cylindrical connector, and a flange located on each side of the slit and extending along a portion of the length of the third cylindrical connector, each flange having at least one hole aligned with a hole on the opposite flange to receive a fastener to draw the opposed flanges together and decrease the diameter of the third cylindrical connector.

9. The coupling device of claim 8, wherein the third cylindrical connector is at an angle of about 90 degrees with respect to the first and the second cylindrical connectors.

\* \* \* \* \*